Sept. 19, 1967    WILLIAM KWO-WEI CHEN ET AL    3,342,719
ION EXCHANGE MEMBRANE FABRICATION Filed June 5, 1963                    6 Sheets-Sheet 1

INVENTORS
WILLIAM KWO-WEI CHEN
RICHARD NIELSON SMITH

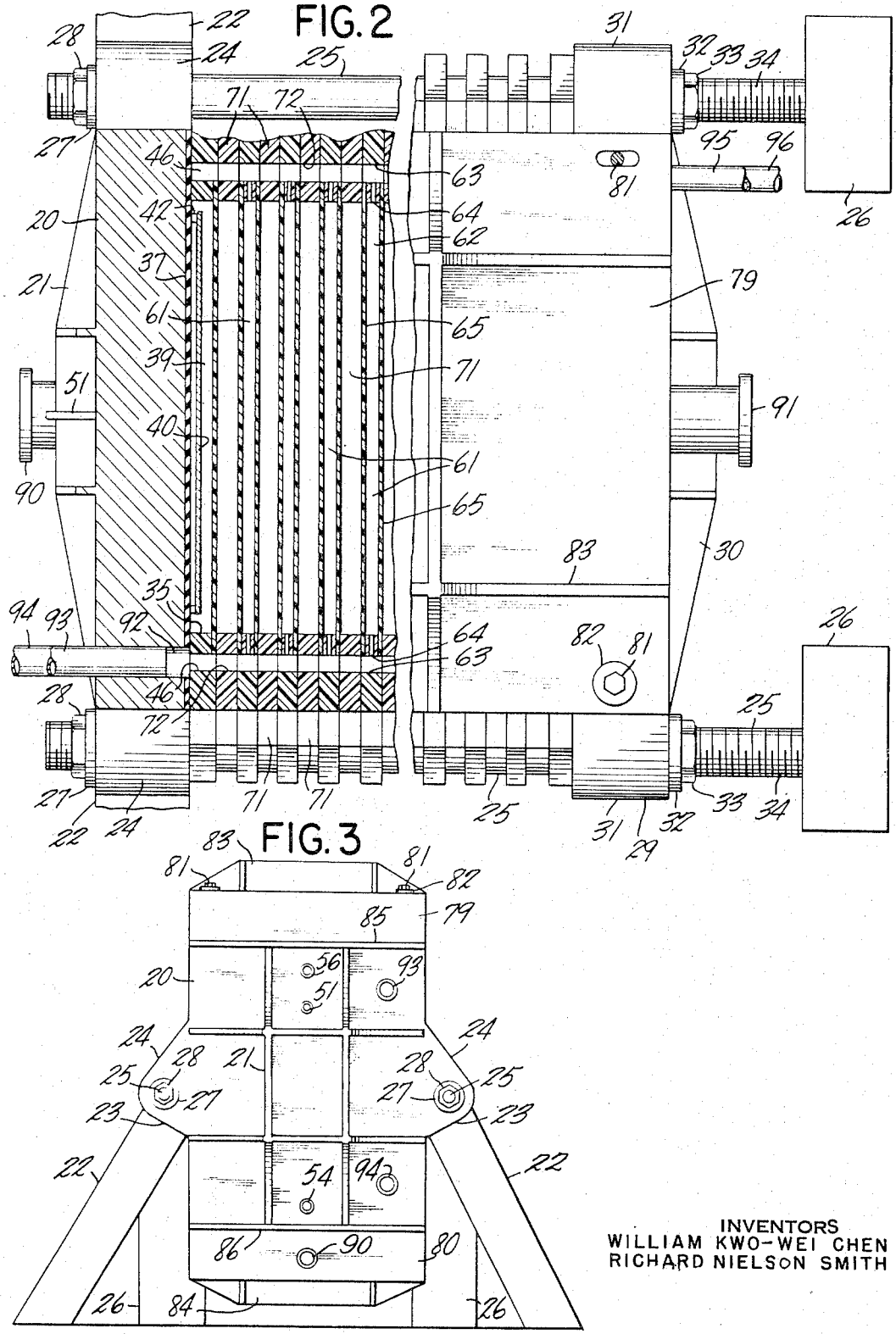
Sept. 19, 1967  WILLIAM KWO-WEI CHEN ET AL  3,342,719
ION EXCHANGE MEMBRANE FABRICATION
Filed June 5, 1963  6 Sheets-Sheet 2
INVENTORS
WILLIAM KWO-WEI CHEN
RICHARD NIELSON SMITH

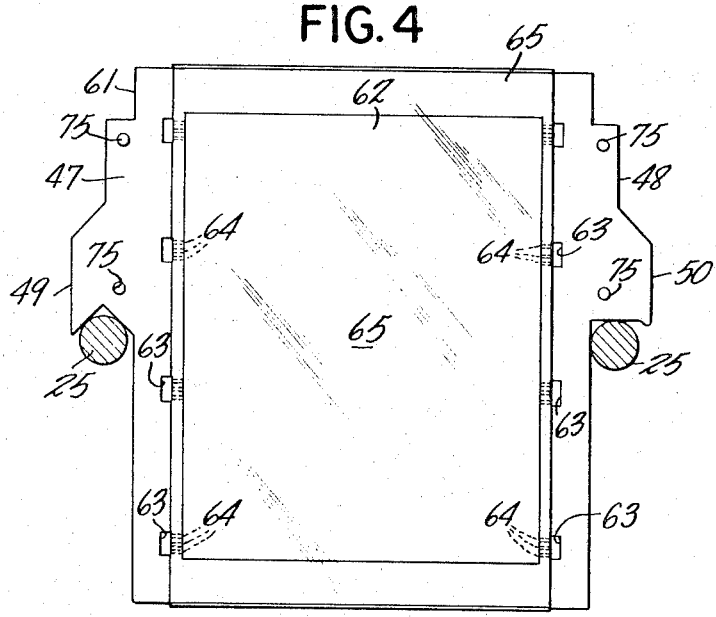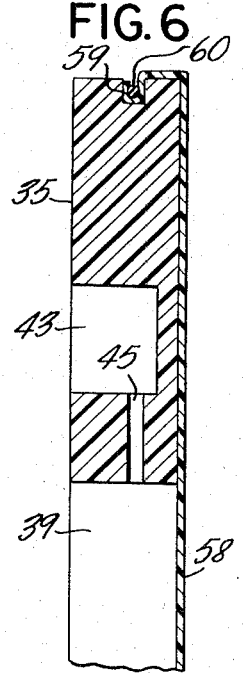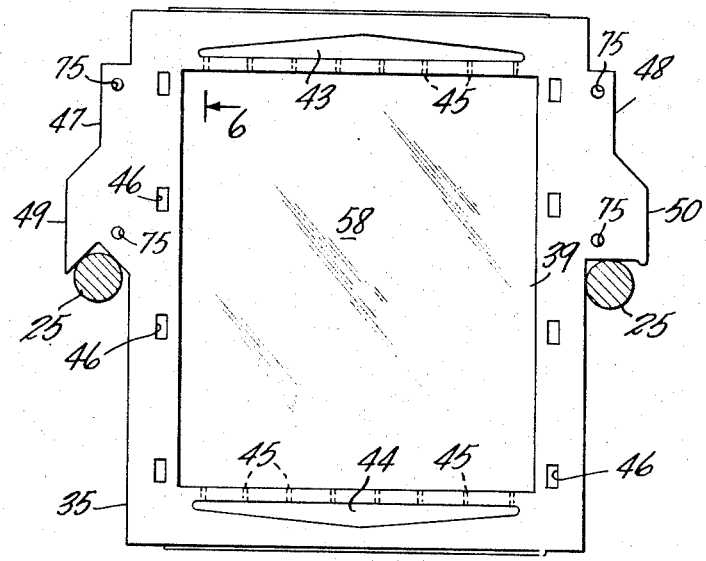

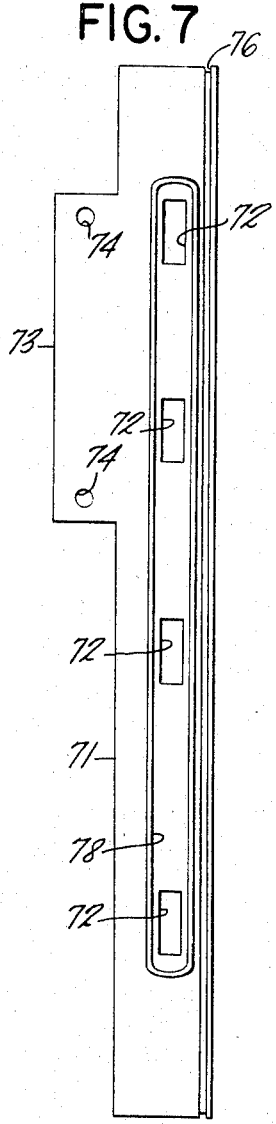
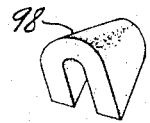
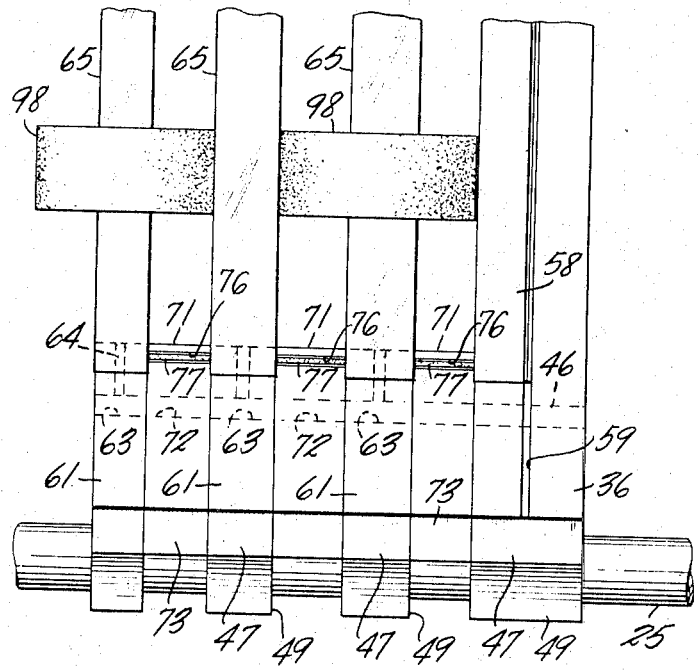
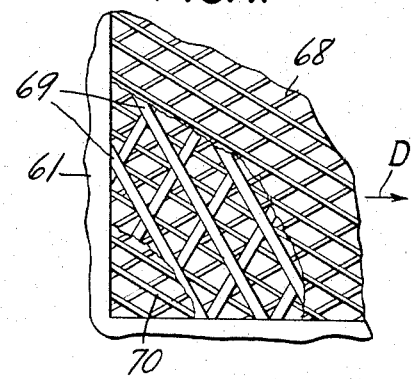
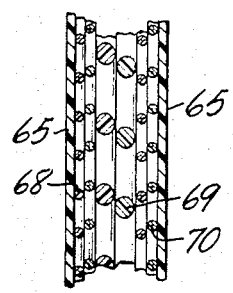
INVENTORS
WILLIAM KWO-WEI CHEN
RICHARD NIELSON SMITH Sept. 19, 1967 WILLIAM KWO-WEI CHEN ET AL 3,342,719
ION EXCHANGE MEMBRANE FABRICATION
Filed June 5, 1963 6 Sheets-Sheet 5
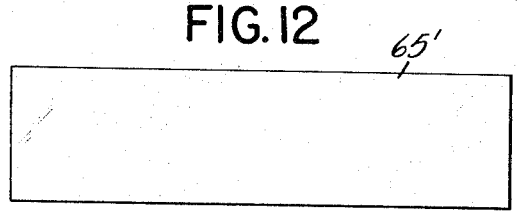
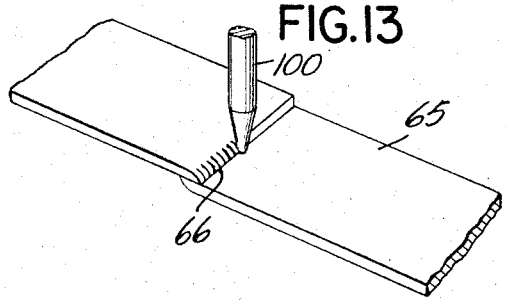
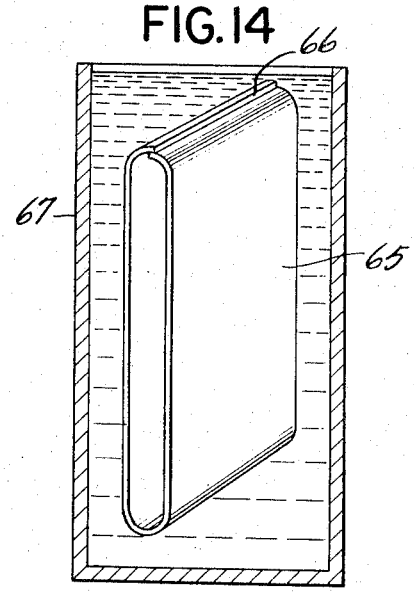
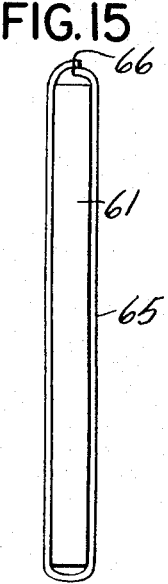
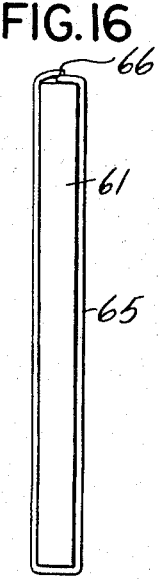
INVENTORS
WILLIAM KWO-WEI CHEN
RICHARD NIELSON SMITH Sept. 19, 1967 WILLIAM KWO-WEI CHEN ET AL 3,342,719
ION EXCHANGE MEMBRANE FABRICATION
Filed June 5, 1963 6 Sheets-Sheet 6

INVENTORS
WILLIAM KWO-WEI CHEN
RICHARD NIELSON SMITH 3,342,719
ION EXCHANGE MEMBRANE FABRICATION
William Kwo-Wei Chen, Stamford, and Richard Neilson Smith, East Norwalk, Conn., assignors to American Machine & Foundry Company, a corporation of New Jersey
Filed June 5, 1963, Ser. No. 285,774
9 Claims. (Cl. 204—301)

This invention relates in general to electrochemical systems, and, more particularly, to electrodialysis apparatus for the treatment of food products and to other sealed systems such as fuel cells.

Food products, such as citrus juice, particularly grapefruit and orange juice may be processed in electrochemical apparatus to neutralize excess acidity. This acid neutralization of citrus juice improves its flavor. Apparatus to neutralize excess acidity in citrus juice and other food products may consist of multiple fluid treatment compartments defined by anion permeable membranes disposed between a pair of electrodes. Alternate compartments contain an alkali solution, such as NaOH, and the interspersed fluid treatment compartments contain the food product in which the acid is to be neutralized. Food products, such as citrus juice, contain approximately 3% solids in the form of a low density pulp. Thus electrodialysis apparatus to handle food products must contain smooth open flow channels which are less likely to become clogged and the apparatus must be easily disassembled for cleaning.

It is, therefore, an object of this invention to provide apparatus for food processing which contains smooth, open and easily cleaned flow channels for the food products.

Another object of this invention is to provide electrochemical processing systems which may be more easily disassembled for inspection and cleaning.

A further object of this invention is to provide a sanitary electrochemical stack for food processing which substantially eliminates any possibility of cross leakage between fluid treatment compartments containing a caustic and the adjacent fluid treatment compartments containing a food product for human consumption.

Still another object of this invention is to provide a large capacity electrochemical system which may be readily disassembled despite the size of its component parts.

Yet another object of this invention is to provide an electrodialysis stack for food processing which has lower flow friction and less pressure drop through the flow channels.

A still further object of this invention is to provide a fluid treatment cell for electrochemical apparatus, the fluid treatment cell having a frame and a central opening therein, the frame having an endless membrane belt extending about it and being stretched tightly between opposite sides of the frame.

Yet a further object of this invention is to provide a fluid treatment cell for electrochemical apparatus, the fluid treatment cell comprising a frame containing a large central opening and an endless belt of membrane material formed by joining the ends of a strip of membrane material together, the endless belt being stretched about the frame.

An additional object of this invention is to provide a method whereby an endless belt of membrane material may be tensioned across a frame containing a central opening to provide a fluid treatment cell for an electrochemical apparatus.

Many other objects, advantages and features of invention reside in the construction, arrangement and combination of parts involved in the invention and its practice as will be understood from the following description and accompanying drawing wherein:

FIGURE 2 is a section taken on lines 2—2 of FIGURE 1 with the outer edges of some frames and juice cell spacers broken away to show a support rod;

FIGURE 3 is an end view of the apparatus;

FIGURE 4 is a plan view of a frame supported on two support rods and having an endless belt of membrane material positioned on the frame;

FIGURE 5 is a plan view of an electrode compartment forming frame resting on two support rods and having a single sheet of membrane fixed over one side of it;

FIGURE 6 is a section taken on line 6—6 of FIGURE 5;

FIGURE 7 is a plan view of a juice spacer;

FIGURE 8 is a view in perspective of the tear drop spacers employed to maintain spacing between the frames;

FIGURE 9 is a top view of fragments of a number of frames, juice spacers, and an electrode compartment forming frame assembled together;

FIGURE 10 is a cross section showing three screen spacers extending between the membrane walls of a caustic cell;

FIGURE 11 is a plan view of a fragment of a corner of a caustic cell showing three layers of screen spacers within it;

FIGURE 12 is a plan view of a strip of membrane material;

FIGURE 13 is a perspective view of the ends of the strip of membrane material being sealed to form an endless belt;

FIGURE 14 is a vertical section through a tank in which the endless belt of membrane material, shown in perspective, is immersed;

FIGURE 15 is an end view of the endless belt of membrane material being placed over a frame;

FIGURE 16 is an end view of the frame with the endless belt stretched tightly in position about it;

Figure 1:
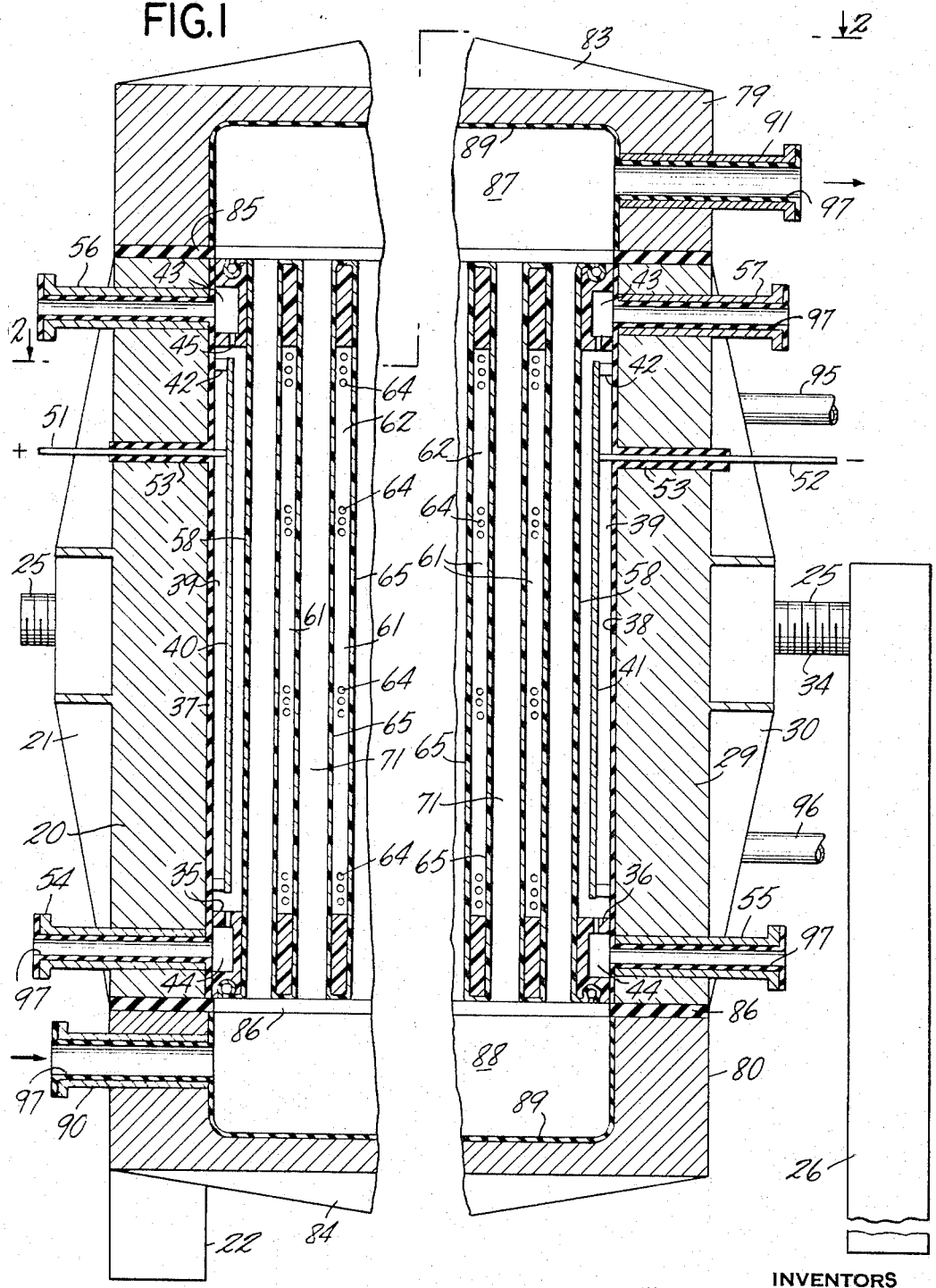
FIGURE 1 is a longitudinal vertical section through the center of an apparatus according to this invention with a central portion broken away and with screen spacers removed from the caustic cells.

Referring to the drawing in detail, FIGURES 1, 2 and 3 show a large fixed cast iron end plate 20 which has the reinforcing and stiffening flanges 21 cast integrally with it. The fixed end plate 20 is supported by the two fixed beams 22 which bear against the flattened undersides 23 of the lateral projections 24. Extending through the lateral projections 24 are the ends of the two massive support rods 25 which have their other ends supported in the fixed columns 26. Washers 27 are placed about the ends of support rods 25. The support rods 25 are held within the fixed end plate 20 by the nuts 28 which are turned against the washers 27.

A movable end plate 29, having the integrally cast reinforcing and stiffening flanges 30, is slidably supported on the support rods 25 by the two lateral projections 31 through which the support rods 25 pass. Washers 32 are disposed about the support rods 25 which have the threaded end portions 34. The nuts 33 engage the threaded end portions 34 so that the nuts 33 may be tightened against washers 32 to urge the movable end plate 29 towards the fixed end plate 20.

Referring now to FIGURES 1, 2, 5 and 6, electrode compartment forming frames 35 and 36 are placed adjacent to the rubber coated flat inner surfaces 37 and 38 of the end plates 20 and 29. The electrode compartment forming frames have large central openings 39 within which there are disposed the electrodes 40 and 41 supported on suitable spacers 42.

Referring further to FIGURES 5 and 6, each electrode compartment forming frame has an upper and lower manifold groove 43 and 44 formed in it. Small internal fluid flow passages 45 extend between the manifold grooves 43 and 44 and the large central openings 39 in the frames 35 and 36. A number of longitudinal internal fluid flow apertures 46 are formed in the sides of the frames 35 and 36. The frames 35 and 36 have lateral projections 47 and 48 extending from their sides. The projections 47 have larger lower portions 49 which form an inverted V which rests upon a support rod 25 to vertically and laterally position one side of the frames 35 or 36. Projection 48 has a larger lower portion 50 with a flat bottom which rests upon the other support rod 25 to vertically position it.

Two leads 51 and 52 are connected to the electrodes 40 and 41 and extend through the end blocks 20 and 29 surrounded by suitable insulation 53. Inlet pipes 54 and 55 extend through the bottom portions of end plates 20 and 29 to communicate with the lower manifold grooves 44. Outlet pipes 56 and 57 extend through the tops of the end plates 20 and 29 to communicate with the manifold grooves 43. A single anion permeable membrane sheet 58 extends over the top and bottom of each frame 35 and 36 in front of the electrodes 40 and 41.

As shown in FIGURES 6 and 9, the frames 35 and 36 have transverse grooves 59 formed across their top and bottom edges. The membranes 58 are secured within the grooves 59 by means of a length of O-ring rubber 60 which has the membrane 58 wrapped about it and which is then packed tightly into groove 59.

Referring now to FIGURES 1, 2 and 4, caustic cell frames 61 each contain a large central opening 62. Fluid flow apertures 63 are formed in the sides of the frames 61 which have the small communicating channels 64 extend from the apertures 63 to the opening 62. The sides of the frames 61 have lateral projections 47 and 48 with larger lower portions 49 and 50 as do the electrode compartment forming frames 35 and 36 except that the frames 35 and 36 are thicker than the frames 61 to accommodate the electrodes 40 and 41. Stretched about each frame 61 is an endless band of membrane material 65.

As shown in FIGURES 12 through 16, a strip of membrane material 65' is treated to render it anion permeable in the conventional manner. Strip 65' is then cut in a wet condition to permit good dimensional control to a length approximately ½% to 2% shorter than the required length of membrane 65 to extend completely about a frame 61. As shown in FIGURE 13, the ends of the membrane 65' are sealed together with about a ⅟₁₆ inch overlap to form the endless belt 65.

The seal 66 may be made by adhesive, clamps or preferably by an ultrasonic butt type sealing tool 100 using about 90 watts of power at 20 kilocycles per second with .002 inch tool penetration into lapped wet plastic 65' which is .006 inch thick. Membranes which may be ultrasonically sealed are first made for example by soaking polyethylene sheet stock in a bath of styrene monomer; removing the sheet from the bath with imbibed styrene; the styrene is polymerized and the copolymer is then treated to render it ion selective. With this invention, membranes in the wet state have been sealed and fused for the first time. The seal or seam 66 is only about ⅟₁₆ of an inch across and does not result in much difference in over-all membrane thickness so that the seal 66 may be positioned on the edge of a frame 61.

Ultrasonic bonding of ion-exchange membrane is accomplished by mechanical compression and decompression of the film at ultrasonic speeds causing molecular heat and subsequent fusion. A very important characteristic of this method is that the material need not be dry in order to bond. The molecular heat generated by the ultrasonically driven tool is localized in the precise area where the bond is to be made and no other place. There is no damage to adjacent areas and the process does not depend upon the thermal conductivity of the material. Ion-exchange membranes with imbibed water content of 6 to 35% have been welded successfully. Ion exchange membranes which have been air dried have been welded also. Thus imbibed water ranging from 3 to 55% is no obstacle to welding by this method.

The ultrasonic hammering exerts pressure in the order of 100–10,000 p.s.i. in strokes in the range of 0.0005–0.005 inch. The tool applies pressure perpendicular to the material which rests upon a solid anvil.

The power applied is proportional to the amplitude of hammering stroke and can be changed to suit the conditions under which the weld is made; variations in power from 50–400 watts have been successfully employed to bond ion exchange films. The depth of the tool penetration can be varied. Ion exchange membranes have been bonded with as little as 0.0001 inch to as much as 0.002 inch penetration. The tool penetration varies in order to satisfy a pre-set area-weight relationship. Generally more satisfactory welds are obtained when the lower range of pressures are used. Great variability in this respect can be achieved by choosing an appropriate speed of traverse of tool or movement of material. Speeds of 0 to 100 feet per minute have been used.

Various films have been welded which ranged in thickness from 0.00025 to 0.1000 inch. Lap and butt weld are possible; the bonds range in width from about 0.005 to 0.50 inch.

Fabric backed materials seal well with fabric to fabric bonds possible. Ion exchange membranes have been bonded to non-ion-exchange materials. Various microporous filter membranes have been bonded by this technique.

Ordinarily one does not expect wet material to bond well and in general cross linked ion exchange material is usually not weldable. It is an unexpected useful result of this process that it has been possible to weld ion exchange material both to itself and to other polymers.

The sealing achieved by this method is tight enough in the case of oxygen and hydrogen fuel cell construction that leakage of gas which may result in explosion in the presence of a catalyst is avoided.

Envelopes and belts of membrane may be sealed to form open or closed sleeves and thus when pressed flat and folded may be sealed along two, three or four edges in addition to the fold line to make a rectangular double sheet frame cover. Three-sided sealing in the shape of a bag is useful in leaf type construction; four sides are best sealed for fuel cells. Manifold holes are used to pass fluid in and out. These holes can be sealed to tubes even more easily than can large edges.

To place the slightly smaller membrane belt 65 on a larger frame 61, the belt 65 must be stretched to fit over the frame and then be allowed to shrink to provide a tight fit. Such stretching may be mechanical elastic stretching or expansion by heat for example. However, a simple and most satisfactory stretching method provides first that the membrane belt 65 be wiped free of surface moisture and then air dried. The belt is then soaked in a container 67 containing a five percent solution of potassium hydroxide in an anhydrous ethyl alcohol for about two hours. This soaking expands the membrane belt 65 about 10%. As shown in FIGURE 15, belt 65 may then easily be slipped about frame 61. After fitting the belt 65 loosely about frame 61, the alcoholic potassium hydroxide solution is washed off the belt and the belt and its frame 61 are soaked in water. In a few hours, the belt 65 will tend to shrink back to its original dimensions so that it will shrink tightly onto the frame 61. The unsupported surfaces of the membrane 65 will then, even under wet conditions, be under tension and tight in appearance.

If the frames 61 are of a suitable plastic, such as polyethylene, each frame 61 may have the ends of a strip of stretched plastic 65 ultra-sonically sealed directly to the top of the frame 61. The plastic belt 65 thus formed could then be shrunk in position about the frame to which it was attached.

Referring now to FIGURES 10 and 11, three screen spacers 68, 69 and 70 are placed within the openings 62 in each caustic cell frame 61. The screen spacer 68, 69 and 70 are each formed from two layers of parallel strands of plastic material. The strands in the two layers are disposed at an angle of about 60° to each other and the strands of the different layers are bonded together at their points of contact. The outermost screens 68 and 70 thus formed have their strands disposed about ¼ inch apart with the strands forming an angle of 30° to the direction of flow through the cell indicated by the arrow D. The center screen 69 is of a much larger mesh size with its strands also forming an angle of 60° with each other. However, the central screen 69 is disposed with its strands forming an angle of 60° with the direction of flow through the caustic cell as indicated by arrow D. This particular screen spacer structure tends to obstruct flow in the center of the caustic cells about screen spacers 69 because the screen spacers 69 offer a greater hydraulic resistance in the direction of flow across each cell. This greater hydraulic resistance of screen spacers 69 causes a greater flow of fluid past the membranes 65 through the screen spacers 68 and 70.

Referring now to FIGURES 1, 2, 7 and 9, a pair of juice spacers 71 are disposed between the sides of the caustic cell frames 61 and adjacent to the electrode compartment forming frames 35 and 36. The juice spacers 71 contain the fluid flow apertures 72 which are aligned with the fluid flow apertures 63 in the cell frames 61. Each juice spacer 71 has a lateral projection 73 containing two alignment apertures 74. The frames 61 and the electrode compartment forming frame 35 have alignment projections 75 which enter the alignment apertures 74 in adjacent juice spacers to position them along the sides of adjacent frames.

As may be further seen in FIGURES 7 and 9, an O-ring channel 76 is formed completely about each juice spacer 71 close to its inner edge. An endless O-ring gasket 77, as may be seen in FIGURE 9, extends completely about the inwardly disposed surface of each juice spacer 71. An elongated O-ring channel 78 is formed on each side of each juice spacer 71 completely about the fluid flow apertures 72. O-ring bands (not shown) are placed within the O-ring channels 78 prior to the assembly of the juice spacers.

Referring now to FIGURES 1, 2 and 3, after frames 35, 36 and 61 with interspersed juice spacers 71 are assembled between the end plates 20 and 29, the nuts 33 are tightened to clamp and hold the frames and spacers together. As shown in FIGURES 2 and 9, the tops and bottoms of the membrane covered caustic cell frames 61 are unsupported from one side of the apparatus to the other. The spacing between these tops and bottoms of the frames 61 may be maintained by means of the soft rubber tear drop spacers 98 which are positioned over and under the top and bottom portions of the frames 61 to space them from each other. These spacers 98 interfere very little with the flow of the food product past the caustic cells and they may be easily removed when the food product or juice cells are to be cleaned.

Referring further to FIGURES 1, 2 and 3, upper and lower manifold plates 79 and 80 are fixed above and below the end plates 20 and 29 by means of the bolts and washers 81 and 82. The upper and lower manifold plates 79 and 80 have the reinforcing and stiffening flanges 83 and 84 cast integrally with them. Thick relatively soft rubber gaskets 85 and 86 extend between the edges of the upper and lower manifold plates and the edges of the top and bottom of the assembled stack. The hollowed out interior portions 87 and 88 of the manifold plates are lined with a rubber coating 89. An inlet pipe 90 leads into one end of the lower manifold plate 80 and an outlet pipe 91 leads out of the other end of the upper manifold plate 79. Suitable baffles (not shown) may be placed in one or both of the manifold plates 79 and 80 to ensure even juice flow through the apparatus.

As shown in FIGURE 2, end plate 20 contains a vertical groove 92 with which the caustic inlet pipes 93 and 94 communicate. Another vertical groove (not shown) is formed in end plate 29 and has the caustic outlet pipes 95 and 96 communicate with it.

As shown in FIGURE 1, the inlet and outlet pipes 90 and 91 and the electrode washing stream pipes 54, 55, 56 and 57 contain suitable rubber linings 97.

This invention operates in the following manner. Alkali solution is introduced through tubes 93 and 94 to be distributed to all the fluid flow apertures 46 in frame 35 by means of channel 92 in end plate 20. The alkali solution then flows through the fluid flow apertures 63 and 72 to flow through the communicating channels 64 into the caustic cells within the endless membranes 65. The sodium hydroxide then flows through the communicating channels 64 on the other side of the stack to enter the fluid flow apertures 63 and 72 and flow from the stack through pipes 95 and 96. Sodium hydroxide electrode washing streams are introduced through pipes 54 and 55 to flow from the stack through pipes 56 and 57 after washing electrodes 40 and 41. Juice, or another food product to be treated, is introduced through pipe 90 and flows between the pairs of juice spacers 71 and adjacent pairs of membranes 65. The treated juice flows from the stack through pipe 91. The electrodes 40 and 41 are connected to a suitable current source (not shown) so that hydroxyl ions move towards the anode through the anion permeable membranes 65 to neutralize acid in the food product as anions liberated in the food product are drawn into adjacent alkali cells through the anion permeable membranes.

After a period of operation of this apparatus, the upper and lower manifold plates 79 and 80 may be removed without disturbing the main stack. This exposes all the food product treatment cells from the top and bottom so that they may be readily inspected visually by viewing from one end of each cell while a light is shown from the other end. Cleaning of the food product treatment cells may also be accomplished from their exposed ends by flushing them with water or by inserting thin brushes. If required, the stack may be further disassembled by backing off nuts 33 and drawing alkali cells and attached juice spacers upward one at a time. Further, in the assembly and complete disassembly of the stack, the alkali cells and their attached juice spacers may be slid along the support rods 25 into position.

Referring now to FIGURE 7, should any alkali solution leak past the O-ring in the channel 78, it would not enter a juice cell but would flow downward between the O-ring in groove 78 and the O-ring in groove 76 to run harmlessly from the stack. Further, to additionally minimize the possibility of cross leakage, the pressure in the juice treatment cells is maintained at about one pound per square inch higher than that in the caustic cells. This provides a safety factor in that any possible leakage which takes place will be from the food product treatment cells into the caustic cells because the caustic at a lower pressure cannot possibly leak into the food product cells to contaminate a food product for human consumption. The screen spacers 68, 69 and 70 support the membranes 65 against this external higher pressure from the juice or food product treatment cells. Similar spacers (not shown) may be placed about the electrodes 40 and 41 to support the adjacent membranes 58 against a higher juice or food product pressure.

To provide the large capacity needed for food and juice processing, one apparatus built according to this invention weighs over 10,000 pounds with about 100 cell pairs. The frame 61 are over four feet across and more than four feet high. The frames 61 are ¼ inch thick and are made from machined polyvinyl chloride. If it is desired, the frames 61 may be made from molded polyethylene or hard rubber. The juice spaces 71 are ¼ inch thick and may be made from the same materials, as the frames 61, or, if desired, they may be made from a soft rubber so that the O-rings and O-ring grooves 76 and 79 are not required.

Figure 17:
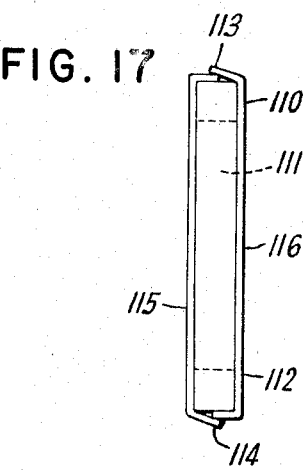
FIGURE 17 is an end view of a frame with an endless belt formed from anion and cation permeable membrane stretched about it.

The ultra-sonic bonding of membranes allows many frame and membrane combinations to be assembled to form fluid treatment compartments other than those shown for the citrus juice processing apparatus of this invention. For example, as shown in FIGURE 17, a frame 110 containing a central opening 111 may have and endless belt 112 placed about it so that the central opening 111 will function as a fluid treatment compartment. If a conventional electrodialysis stack is to be assembled from frames 110 with anion and cation selective membranes, the endless belt 112 may be formed by bonding together at their upper and lower edges 113 and 114 the anion and cation selective membranes 115 and 116.

Figure 18:
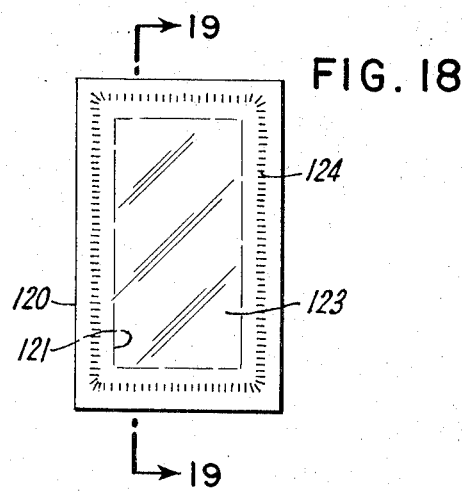
FIGURE 18 is a plan view of a frame with membranes bonded to the frame to form a fluid treatment cell.
Figure 19:
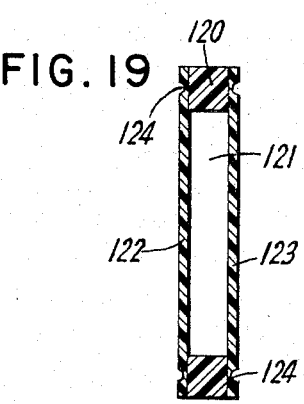
FIGURE 19 is a section taken on line 19—19 of FIGURE 18.

As shown in FIGURES 18 and 19, a frame 120 containing a central opening 121 may have two membranes 122 and 123 bonded to its sides ultra-sonically at 124 to transform opening 121 into a fluid tight fluid treatment compartment.

Figure 20:
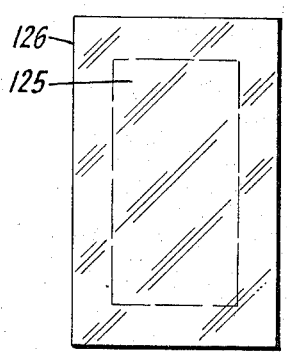
FIGURE 20 is a plan view of a section of membrane material bonded to extend over the center of a surrounding sheet of plastic field material.

As shown in FIGURE 20, a piece of membrane material 125 may be bonded into the center of a larger cut out piece of plastic sheeting 126. This construction may save expense in the fabrication of ion selective membranes in that less expensive plastic material is provided in those areas which are not directly used for fluid treatment. This construction also enables the plastic border 126 to be made of a heavier gauge material than the membrane 125 so that it may be more firmly clamped or otherwise supported and secured in a fluid treatment device. In addition, the bonding of membrane material to itself and to plastics provides a method whereby ripped and torn membranes may be repaired.

The fluid treatment cells of this invention, which have an endless belt of membrane material stretched about a frame, may be formed in still other ways than those already mentioned. A frame, if of hard rubber or the like, can be cooled to cause it to shrink or contract whereupon an endless belt of membrane material at ambient temperature can be slipped about the frame. As the frame itself returns to ambient temperature, it expands to stretch the endless belt of membrane material.

Figure 21:
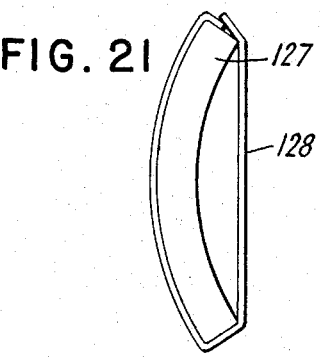
FIGURE 21 is a side view of a frame flexed to allow an endless belt of membrane material to be slipped over it.
Figure 22:
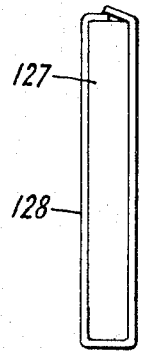
FIGURE 22 is a side view of the frame shown in FIGURE 21 allowed to spring out to stretch the endless belt of membrane material about it.

Further, as shown in FIGURE 21, if the frames 127 are sufficiently bent or flexed about a horizontal and lateral axis, an endless membrane 128 may be slipped in place. As shown in FIGURE 22, when the frames 127 are then allowed to spring back into their normal flat configuration, they exert a desired tension on the membrane belts. Finally, mechanical expansion devices could be built into the frames to expand them and tension the endless belts to a desired degree.

The stretching of endless belts about the frames helps to prevent cross leakage and gives rise to other advantages. The tensioned membrane faces are flat and provide minimum hydraulic flow interference and the assembled membranes and frames are easier to handle. Further, the tensioned membranes may continue to be used over long periods of time despite the inevitable expansion in length of the mambrane material with time and use. The tension in a membrane of some elasticity will take up a certain amount of the expansion while merely relieving some of the tension. This allows the remaining tension to hold the membrane in place.

What is claimed is:

1. The process of making a fluid treatment cell for electrochemical apparatus comprising the steps of forming a cell frame with a large central opening, forming an endless belt of membrane material smaller than the distance about the cell frame, expanding the endless belt to fit easily over the cell frame by soaking the endless belt in a first liquid, placing the expanded endless belt about the cell frame over the large central opening, and shrinking the belt tightly about the cell frame by placing the cell frame and the endless belt in a second liquid.

2. The process according to claim 1 wherein said endless belt of membrane material is formed by ultrasonically sealing together the ends of a strip of membrane material in the wet state.

3. The process of making a fluid treatment cell for electrochemical apparatus comprising the steps of forming a cell frame with a large central opening, expanding a strip of membrane material by placing it in a basic solution of anhydrous alcohol, ultrasonically sealing the ends of the expanded strip of membrane material to one edge of the cell frame with the membrane material extending about the cell frame over the large central opening, and shrinking the strip of membrane material tightly over the large central opening by immersing the cell frame and the strip of membrane material in a water solution.

4. The process as defined in claim 3 including the ultrasonic sealing of ion selective membrane material in the wet state.

5. The process according to claim 3 in which the ultrasonic sealing is carried out by applying from 50 to 400 watts to an ultrasonic sealing tool and the tool penetration is from .0001 inch to .002 inch.

6. The process according to claim 3 including the ultrasonic sealing of ion selective membrane material in the wet state to itself and to other plastic polymer material.

7. The process of making a fluid treatment cell for electrochemical apparatus comprising the steps of forming a cell frame with a large central opening, forming an endless belt of membrane material smaller than the distance about the cell frame, heating and expanding the endless belt, placing the endless belt about the frame, and allowing the belt to cool shrinking about the frame.

8. The process of making a fluid treatment cell for electrochemical apparatus comprising the steps of forming a cell frame with a large central opening, forming an endless belt of membrane material smaller than the distance about the cell frame, cooling and contracting the cell frame, placing the belt about the contracted cell frame, and allowing the cell frame to return to ambient temperature and expand to stretch the endless belt about the cell frame.

9. In an electrochemical apparatus, a cell frame having a large central opening and an endless belt of membrane material stretched about said cell frame over the large central opening, said endless belt covering the opening from both sides of said cell frame and forming a tightly sealed chamber with said cell frame, the part of said endless belt covering one side of the opening in said cell frame being of anion selective membrane material and the part of said endless belt covering the other side of the opening in said cell frame being of cation selective membrane material.

References Cited

UNITED STATES PATENTS

| | | | |
|---|---|---|---|
| 1,420,037 | 6/1922 | Harris | 204—258 |
| 3,085,970 | 4/1963 | Davis | 204—301 |

FOREIGN PATENTS 1,075,013   4/1954   France.

JOHN H. MACK, *Primary Examiner.*

E. ZAGARELLA, *Assistant Examiner.*